UNITED STATES PATENT OFFICE.

WALTER T. SCHEELE, OF HACKENSACK, NEW JERSEY, ASSIGNOR TO THE GOVERNMENT OF THE UNITED STATES, REPRESENTED BY THE SECRETARY OF THE NAVY.

INCENDIARY MIXTURE.

1,382,806.     Specification of Letters Patent.    Patented June 28, 1921.

No Drawing.    Application filed December 9, 1919. Serial No. 343,571.

*To all whom it may concern:*

Be it known that I, WALTER T. SCHEELE, a citizen of Germany, and having made application for citizenship in the United States, and a resident of Hackensack, New Jersey, have invented new and useful Improvements in Incendiary Mixtures, of which the following is a specification.

This invention relates to an incendiary mixture for use in warfare.

An object of the invention is to provide an incendiary mixture which is voluminous, light in weight, non-self-combustible, does not ignite when shot through with a high velocity bullet and will not deteriorate nor decompose when exposed to the dampness of the air for a length of time. Further, can easily be handled, transported without danger of explosion, and which, when ignited, will produce an extraordinary heat, will melt a lead container of substantial thickness, and when burning, produce a long, sharp pointed and bright yellow flame, without the formation of black smoke or the evolution of sparks. Altogether a substance well adapted for incendiary and aerial bombs and shells.

I have discovered that I can prepare an incendiary mixture which will answer the above-mentioned properties, by mixing hexamethylenetetramin and sodium peroxid with a high velocity oil of 620 flash and having a viscosity of 140. In carrying out this, my invention, I may use, Hexamethylenetetramin ---- 30 lbs.
Sodium peroxid ----------- 60 "
Cylinder oil, 620 flash ----- 45 "

The hexamethylenetetramin as well as the sodium peroxid, in granulated form, may be pulverized to a fine powder and then mixed with the oil in the proportion given which forms a pasty mass. The hexamethylenetetramin and the sodium peroxid powder should be mixed first and should be allowed to stand for an hour after such mixing, during which time I assume a reaction to take place in the solid state which is indicated by the lack of the usual tendency of the sodium peroxid to absorb moisture from the surrounding air; and I further assume, the formation of a compound having the composition, $$C_6H_{12}N_4Na_2O_2$$

which is analogous to the non-explosive compound having the formula $$C_6H_{12}N_4H_2O_2$$

As further evidence of the formation of this compound, the reaction product of hexamethylenetetramin and sodium peroxid may be mixed with the oil without appreciable rise in temperature and without noticeable saponifying effect. It will also be observed that the proportions which I have chosen for the hexamethylenetetramin and sodium peroxid lie very close to the theoretical proportions demanded by the composition or formula:

$$C_6H_{12}Na_2O_2$$

And in addition, the susceptibility of the composition, without the addition of oil, to detonation, as established by careful fragmentation tests in steel shells, becomes a maximum at approximately the limits I have given in the example and falls off very rapidly as the proportions of hexamethylenetetramin and sodium peroxid are varied from the proportions:

Hexamethylenetetramin ----- $33\frac{1}{3}\%$
Sodium peroxid ----------- $66\frac{2}{3}\%$ The reaction of hexamethylenetetramin and sodium peroxid to form a third substance having the formula (empirical) mentioned above, is vital to my invention, as the formation of this third substance tends to prevent any excess of sodium peroxid, over the amount necessary for the formation of the compound, from deliquescing in the air, and thus insures the stability of the composition.

I have found it advisable to allow the powdered hexamethylenetetramin and sodium peroxid, after being thoroughly mixed, to remain in contact for an hour before the addition of oil—thus insuring adequate time for the completion of the reaction.

The dry powdered material may then be added to the oil, with constant stirring in order to insure a homogeneous mixture. During the process of mixing in, and incorporation with the oil, as well as the mixing of dry powders, it is preferable that the operations should be carried out in metal containers, as the presence of matter of an organic origin may result in ignition.

The proportion of the various amounts of hexamethylenetetramin, sodium peroxid and oil may be varied in certain limits, thereby either obtaining a mixture of an oily consistency or a dry, brownish powder; the speed with which the material burns decreasing directly with the addition of the oil.

The hexamethylenetetramin and sodium peroxid, which are the basic ingredients of the incendiary mixture, are rendered inert to ignition by the addition of oil, which is also vital to my invention, as it will be apparent that the incendiary mixture will not be ignited when shot through with a high velocity bullet.

In preparing the incendiary mixture for use, the hexamethylenetetramin and sodium peroxid, in the proportions above mentioned are mixed in any suitable mixing machine. They are reduced to a fine powder, after which the oil is gradually added. The compound thus obtained, being of semi-paste form, is now ready to be passed through sieves, to bring the mass to a granulated state, after which the compound can be compressed into cakes of desired form or thickness in a suitable press under high pressure.

In order to prevent the compound from deteriorating, or as a protection against moisture and other objectionable influences, the granulated form or compressed form may be treated with ceresin, wax or any other hydro-carbons, gums, shellacs, or metals in powder form. The shellacs and gums may be dissolved in ethyl-methylketone, alcohol, amyl-acetate, acetone, or any other suitable solvent. The metals are suspended in casein, collodium or varnish solutions in order to facilitate their application. The compound is now in condition for use and may be pressed, poured or filled into suitable containers, such as hollow lead balls, tubes, or other metallic cases.

I do not limit myself to the exact proportions of ingredients as above stated, for it may be preferable to vary these proportions under certain conditions. By increasing the proportion of oil, I obtain a compound which will produce the desired results, the resultant composition forming a heavy liquid having the same physical properties, more readily facilitating the filling of the containers.

In use, the mixture may be ignited by any well-known methods, such as by fuse, detonator, percussion cap. or by the action of sulfuric acid, contained in a vial which may be burst at the desired moment by any simple mechanical device. The ignition of the incendiary mixture produces an exceedingly voluminous and high temperatured gas flame which is extensive as well as intensive in its action on surrounding combustibles, and in addition, burns without the formation of black smoke—indicating complete combustion, and with an extremely brilliant yellow flame which revolves upon rising into the air. Altogether, a mixture or composition of matter well adapted for use as material in warfare, when filled in aerial bombs and incendiary shells.

I am aware that other oxygen bearing substances may be substituted for the sodium peroxid, such as oxids and peroxids of the heavy metals, or various nitrates, chlorates, perchlorates, etc., but I have found that sodium peroxid best suits the object of my invention on account of the fact of its peculiar reaction with the hexamethylenetetramin.

What I claim is:—

1. An incendiary mixture containing hexamethylenetetramin, sodium peroxid, and an oil.

2. An incendiary mixture containing hexamethylenetetramin and sodium peroxid. and an oil in the proportions 30—40—45.

3. The process of making an incendiary mixture which comprises mixing hexamethylenetetramin with sodium peroxid, allowing the mixture to stand to effect a thorough reaction, and subsequently adding to the mixture a high flash oil.

4. An incendiary mixture containing hexamethylenetetramin and sodium peroxid both in fine powder state, together with a high flash oil.

5. An incendiary mixture containing hexamethylenetetramin and sodium peroxid, the first in finely crystallized, the other in granulated form.

6. An incendiary mixture containing hexamethylenetetramin and sodium peroxid and high flash oil, producing upon ignition a constant heat above 1000° C.

7. An incendiary mixture consisting of hexamethylenetetramin, sodium peroxid, and a high flash oil combined into a dry powder.

8. An incendiary mixture consisting of hexamethylenetetramin, sodium peroxid, and high flash oil in granulated form.

9. An incendiary mixture consisting of hexamethylenetetramin, sodium peroxid, and a high flash oil in granulated form, said granules being covered with a coating containing shellac.

10. An incendiary mixture consisting of hexamethylenetetramin. sodium peroxid, and a high flash oil in granulated form, said granules being covered with a coating containing shellac, and a finely powdered metal.

Signed at Washington, District of Columbia, this 15th day of November, 1919.

WALTER T. SCHEELE.